United States Patent
Venkatesh et al.

(10) Patent No.: US 10,134,170 B2
(45) Date of Patent: Nov. 20, 2018

(54) STEREOSCOPIC RENDERING USING VERTIX SHADER INSTANCING

(71) Applicant: Intel Corporation, Santa Clara, CA (US)

(72) Inventors: Abhishek Venkatesh, Hillsboro, OR (US); Adam Leibel, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 63 days.

(21) Appl. No.: 14/038,725

(22) Filed: Sep. 26, 2013

(65) Prior Publication Data

US 2015/0084949 A1 Mar. 26, 2015

(51) Int. Cl.
   G06T 15/00     (2011.01)
   H04N 13/275    (2018.01)
   H04N 13/02     (2006.01)

(52) U.S. Cl.
   CPC ....... G06T 15/005 (2013.01); H04N 13/0275 (2013.01); H04N 13/275 (2018.05)

(58) Field of Classification Search
   CPC .......................................... G06T 15/00–15/87
   See application file for complete search history.

(56) References Cited

U.S. PATENT DOCUMENTS

| 6,515,663 B1* | 2/2003 | Hung ..................... G06T 15/20 345/419 |
| 7,701,459 B1* | 4/2010 | Mrazek ................. G06T 15/005 345/420 |
| 8,004,515 B1* | 8/2011 | Cook ..................... G03B 35/00 345/419 |
| 2008/0007559 A1* | 1/2008 | Kalaiah ................ H04N 13/275 345/501 |
| 2011/0063285 A1* | 3/2011 | Hoover ................. G06T 15/005 345/419 |
| 2012/0056992 A1* | 3/2012 | Kuroda ................. G06T 19/006 348/46 |
| 2012/0235999 A1* | 9/2012 | Bi ......................... G06T 15/005 345/426 |
| 2014/0192053 A1* | 7/2014 | Bi ......................... G06T 15/005 345/426 |

OTHER PUBLICATIONS

Sorbier et al., "Multi-view Rendering using GPU for 3-D Displays", GSTF international journal on computing 1, 1 (2010) 44-49, 5 pages.
Sorbier et al., "GPU rendering for autostereoscopic displays", Proceedings of 3DPVT'08—the Fourth International Symposium on 3D Data Processing, Visualization and Transmission, Jun. 18-20, 2008, 7 pages.

* cited by examiner

*Primary Examiner* — Daniel Hajnik

(57) ABSTRACT

Various embodiments are generally directed to techniques to generate stereoscopic views of a scene for purposes of providing an illusion of depth to the scene. An apparatus for stereoscopic rendering includes a processor component; a vertex shader to generate a plurality of vertices corresponding to primitives that are a representation of the scene to be displayed, the vertex shader transforming a first instance of the plurality of vertices to a first projected space in a first portion of a two-dimensional (2D) area and transforming a second instance of the plurality of vertices to a second projected space in the 2D area, the first portion of the 2D area corresponding to a first stereoscopic view of the scene and the second portion of the 2D area corresponding to a second stereoscopic view of the scene.

25 Claims, 7 Drawing Sheets

STEREOSCOPIC RENDERING USING VERTIX SHADER INSTANCING

BACKGROUND

Modern displays include the ability to provide a three-dimensional (3D) viewing experience. For example, stereoscopic displays achieve a perception of 3D depth by presenting an image for each eye of a viewer. More particularly, similar, but slightly offset depictions of a scene are rendered, one to be viewed by the left eye and one to be viewed by the right eye. The viewer's brain then commingles the images such that a 3D depth to the scene rendered in the image is perceived. Some stereoscopic displays rely on companion glasses that work in conjunction with the display so that each eye is allowed to view the image intended for that eye. For example, the glasses may include filters or shutters that open and close in concert with the display frequency. More complex stereoscopic viewing experiences exist, such as, auto-stereoscopic displays, holographic displays, etc.

Accordingly, stereoscopic techniques require multiple views of each scene. For example, a basic stereoscopic display requires a right eye and a left eye version of each scene. Conventional techniques individually render each view of a particular scene. Said differently, each scene is processed through the rendering pipeline for every necessary view (e.g., right eye, left eye, etc.) Rendering each scene more than once causes significant overhead for graphics processing components and central processing components of a system.

In order to alleviate this burden, some techniques employ a geometry shader to duplicate the geometry of the objects depicted in the scene and transform them for each stereoscopic view. For example, the scene would be processed through the rendering pipeline once, passed to the geometry shader, where the geometry in the scene is duplicated and transformed to produce the multiple views of the scene. Many computing platforms and graphic software applications, however, lack support for geometry shaders. Furthermore, the present of geometry shaders in a rendering pipeline adds computational overhead and complexity above rendering pipelines that do not have geometry shaders. Additionally, as will be appreciated, implementing geometry shaders in hardware is typically much more complex than vertex shaders as geometry shaders have variable output capabilities for fixed inputs whereas vertex shaders have fixed outputs for fixed inputs. As such, scheduling threads for vertex shader is typically simpler than for geometry shaders. Furthermore, implementation and performance of vertex shaders is generally superior to that of geometry shaders.

DETAILED DESCRIPTION

Figure 1:
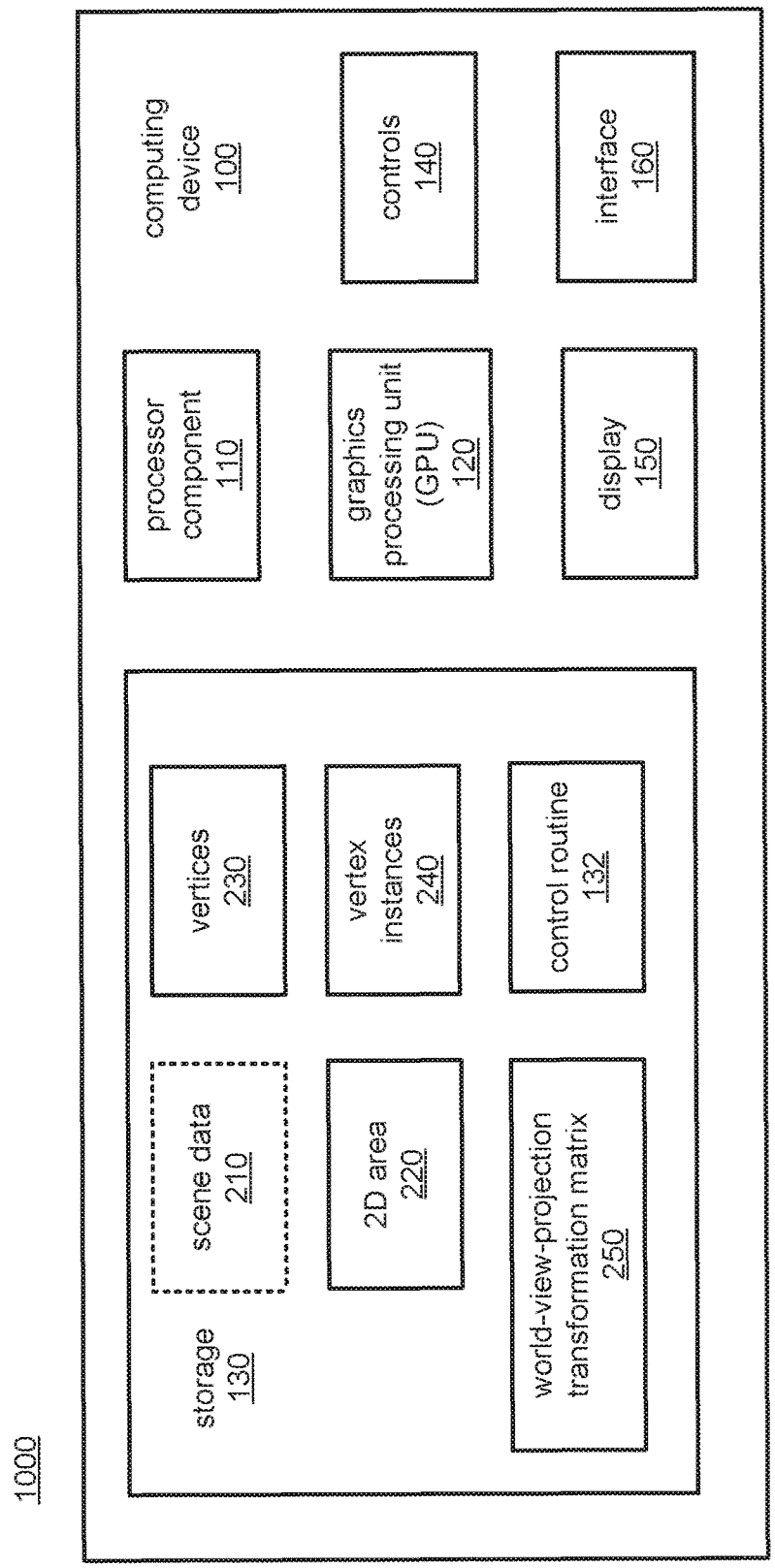
FIG. 1 illustrates an embodiment of a stereoscopic rendering system.

Various embodiments are generally directed to techniques to form multiple views of a scene for display using stereoscopic and/or holographic display devices. As used herein, stereoscopic refers generally to displaying multiple views of a scene to provide an illusion of depth to the scene, and can be implemented as a variety of different display technologies. Use of the term "stereoscopic" is not otherwise intended to be limiting. For example, as used herein, stereoscopic may be interpreted to include holographic techniques or other techniques for providing an illusion of depth to a 2D representation of a scene using a number of views of the scene.

Rendering a scene for stereoscopic viewing includes processing a number of vertices corresponding to primitives (e.g., triangles, quadrilaterals, etc.) that define objects depicted in the scene through a rendering pipeline. The vertices are processed to determine positions of the vertices in a two-dimensional (2D) representation of the scene for each stereoscopic view (e.g., left eye view, right eye view, etc.) The positions of each vertex in the 2D representations are typically offset one from another, which assists in creating the illusion of depth (explained in greater detail below.) Furthermore, the rendering pipeline includes determining various characteristics for the primitives, such as, color, shading, etc. The 2D representation of each stereoscopic view can then be displayed using a stereoscopic display device (e.g., display with stereoscopic glasses, auto-stereoscopic display, holographic projector, etc.) in order to provide viewers with an illusion of depth to the 2D representation of the scene.

For example, a stereoscopic viewing experience can be created by a display and associated glasses having closable apertures over each eye. The apertures of the glasses are configured to open and close in frequency with the displayed stereoscopic views. For example, when the left eye stereoscopic view is displayed, the aperture in front of a user's left eye can be opened and the aperture in front of the user's right eye can be closed. Likewise, when the right eye stereoscopic view is displayed, the aperture in front of a user's right eye can be opened and the aperture in front of the user's left eye can be closed. In this manner, a user may be presented with stereoscopic views that are individually perceived by each eye. The user's brain then commingles these perceived images, and due to the positioning of the objects depicted in the scene (e.g., due to the slightly offset positioning of each vertex in the respective 2D representations) an illusion of depth is often achieved.

The present disclosure provides various examples of rendering stereoscopic views. In general, the rendering pipeline for stereoscopic views includes a number of steps, often performed by different components of a rendering application or tool. An area drawer generates an area corresponding to the 2D projection of the scene. The area includes portions for each stereoscopic view. For example, for a stereoscopic view having a left eye view and a right eye view, the 2D area will include both a first portion (e.g., left eye view) and a second portion (e.g., right eye view.) A vertex shader then transforms vertices corresponding to objects depicted in the scene from a three-dimensional (3D) representation of the scene (e.g., as recorded by a camera, generated by graphics engine, etc.) to positions in the two-dimensional (2D) representation. Said differently, the vertex shader transforms vertices corresponding to primitives that represent the objects depicted in the scene from the vertices position in the 3D space of the scene to the 2D space of the generated area.

As the generated area includes portions for each stereoscopic view, the vertex shader transforms the vertices to positions in each of the portions of the area. The vertex shader includes an instance generator to generate an instance of the vertices for each portion of the generated area. Each instance then allows the position of a vertex to be defined for a particular portion of the area. A vertex transformer transforms each vertex to positions in each of the portions of the area. For example, for the generated area having a first portion (e.g., for a left eye view) and a second portion (e.g., for a right eye view) the vertex shader creates two instances of each vertex, one for the first portion and one for the second portion. The vertex transformer then transforms the position of each vertex from the 3D position in the scene to a position in each of the first and second portions of the 2D area.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a stereoscopic rendering system 1000 incorporating a computing device 100. The computing device 100 may be any of a variety of types of computing devices, including without limitation, a desktop computer system, a data entry terminal, a laptop computer, a netbook computer, a tablet computer, a handheld personal data assistant, a smartphone, a digital camera, a body-worn computing device incorporated into clothing or wearable accessories (e.g., glasses, a watch, etc.,) a computing device integrated into a vehicle (e.g., a car, a bicycle, a wheelchair, etc.), a server, a cluster of servers, a server farm, a station, a wireless station, user equipment, and so forth. Furthermore, the computing device 100 may be any of a variety of types of display generating devices, including without limitation, a DVD player, a portable video player, a console video game system, a television receiver, a video content streaming device, and so forth. Embodiments are not limited in this context.

In some implementations, scene data 210 may be generated by an application executing on the computing device 100 (or another computing device, not shown.) For example, a three-dimensional (3D) computer gaming application may generate the scene data 210. As another example, a 3D computer graphics program, such as, an animation program, may generate the scene data 210. As another example, a camera may record 3d data as a mesh of primitives (e.g., triangles) by scanning real world objects. As another example, the present application may be implemented in heads up displays and/or augmented reality glasses; such as, by detecting markers in the viewer's vision and augmenting them with stereoscopic views rendered as described herein. The generated scene data 210 may then be processed through the stereoscopic rendering pipeline (explained in greater detail below) to generate stereoscopic views of the scene.

Although not depicted, the computing device 100 may exchange signals conveying scene data 210 concerning a scene to be rendered through a network. For example, the computing device 100 may exchange signals conveying scene data 210 (or other data entirely unrelated to a scene to be rendered) with other computing devices (also not shown) via the network. In various embodiments, the network may be a single network possibly limited to extending within a single building or other relatively limited area, a combination of connected networks possibly extending a considerable distance, and/or may include the Internet. Thus, the computing device 100 may be "networked" to another computing device based on any of a variety (or combination) of communications technologies by which signals may be exchanged, including without limitation, wired technologies employing electrically and/or optically conductive cabling, and wireless technologies employing infrared, radio frequency or other forms of wireless transmission.

For example, the computing device 100 may receive scene data 210 concerning a scene to be rendered from another computing device associated with a content streaming service. As another example, the computing device 100 may receive scene data 210 concerning a scene to be rendered from another computing device that is generating objects corresponding to the scene. Said differently, the computing device 100 may receive scene data 210 from another computing device (e.g., a server corresponding to a 3D computer game, another computing device generating scene to be rendered, etc.).

It should be noted that although the computing device 100 is described as a single device, the features of the individual computing device might be incorporated into multiple computing devices. Furthermore, although the computing device 100 is described having various features and functionality (e.g., display functionality) these features may be incorporated into another computing device, peripheral component, or otherwise implemented as a separate device.

In various embodiments, the computing device 100 incorporates one or more of a processor component 110, a graphics processing unit (GPU) 120, a storage 130, controls 140, a display 150, and an interface 160 to couple the computing device 100 to a network and/or another computing device. The storage 130 stores one or more of a control routine 132, the scene data 210, 2D area 220, vertices 230, vertex instances 240, and world-view-projection transformation matrix 250.

In the computing device 100, the control routine 132 incorporates a sequence of instructions operative on the processor component 110 in its role as a main processor component to implement logic to perform various functions. In executing the control routine 132, the processor component 110 receives descriptions of a 3D representation of a scene and stores indications of the descriptions as the scene data 210. As stated above, the descriptions of the 3D representation of the scene may be generated by and/or transmitted from a variety of sources (e.g., a computer game, an animation program, a modeling program, a video provider, etc.) Said differently, the processor component 110 may receive the descriptions of the 3D representation from a software application, which may be executing on the computing device 100 or from another source, as described above.

The control routine 132 further incorporates a sequence of instructions operative on the processor component 110 (e.g., in its role as a main processor component) and/or the GPU 120 (e.g. in its role as a main graphical processing unit) to implement logic to perform various functions. In executing the control routine 132, either of the processor component 110 or the GPU 120 may process the scene data 210 (e.g. through a rendering pipeline) to form multiple 2D representations corresponding to the indications of the 3D representation of the scene, which may subsequently be displayed in a stereoscopic display environment. As will be appreciated, a variety of known technologies or algorithms may be used to implement a rendering pipeline. For example, without limitations, DirectX™ and OpenGL™ are but two examples of technologies for implementing rendering pipelines. Furthermore, portions of the rendering pipeline may implemented by software and/or hardware. The exact nature of rendering pipelines and all specific implementation details are beyond the scope of this disclosure.

In executing the control routine 240, the processor component 110 and/or the GPU 120 generates the 2D area 220, which has a portion for each of the stereoscopic views to be generated for the scene. For example, for two stereoscopic views (e.g., left and right eye views), the 2D area may be formed as a "split screen" wherein one side the screen corresponds to the left eye view and the other side of the screen corresponds to the right eye view. A number of different techniques are known for generating 2D areas during a rending process. The exact manner in which this is done may vary according to the particular implementation, rendering pipeline, etc.

Furthermore, in executing the control routine 132, the processor component 110 and/or the GPU 120 further generate the vertices 230 from scene data 210. More specifically, scene data 210 can be represented by one or more primitives (e.g., polygons, such as, triangles, quadrilaterals, etc.) Each of these primitives can then be defined by their vertices. A number of different techniques are known for representing 3D scene data as primitives and extracting vertices for these primitives. The exact manner in which this is done may vary according to the particular implementation, rendering pipeline, etc.

Additionally, in executing the control routine 132, the processor component 110 and/or the GPU 120 may further generate the vertex instances 240. The vertex instances 240 correspond to the vertices 230, but represent different instances of the vertices 230. Said differently, the vertex instances 240 represent different "copies" of the vertices 230. For example, for two stereoscopic views (e.g., left and right eye view,) two copies of the vertices 230 may be created and saved as the vertex instances 240. The vertex instances 240 represent the differences between each copy (e.g., position, color, texture, etc.) while attributes that are the same between instances may still be referenced in the vertices 230. A number of different techniques are known for forming instances of vertices. The exact manner in which this is done may vary according to the particular implementation, rendering pipeline, etc.

In executing the control routine 132, the processor component 110 and/or the GPU 120 may further transform the vertices 230 to projected spaces in each of the portions of the 2D area 220. More specifically, the 3D position of the vertices in the scene data may be transformed to positions in the 2D area 220 for each instance of the vertices 230. Said differently, a position in the 2D area for each instance of the vertices 230 represented in the vertex instances 240 may be determined. The position may be determined using matrix transformation based on part on the world-view-projection transformation matrix 250.

In various embodiments, the processor components 110 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the GPU 120 may include any of a wide variety of commercially available graphics processing units. Further, one or more of these graphics processing units may have dedicated memory, multiple-threaded processing and/or some other parallel processing capability.

In various embodiments, the storage 130 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 160 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
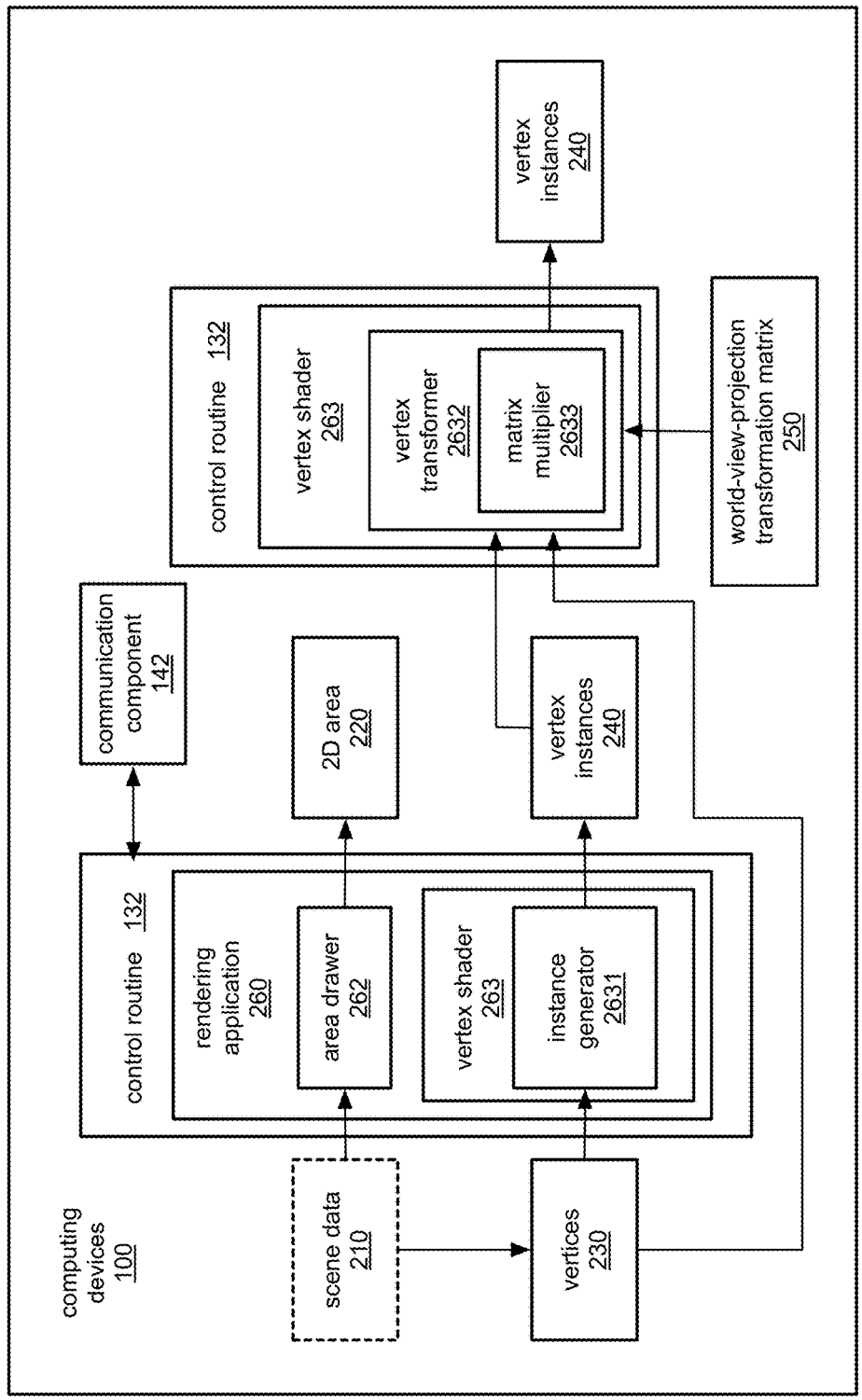
FIGS. 2-3 each illustrate a portion of an embodiment of the stereoscopic rendering system.
Figure 3:
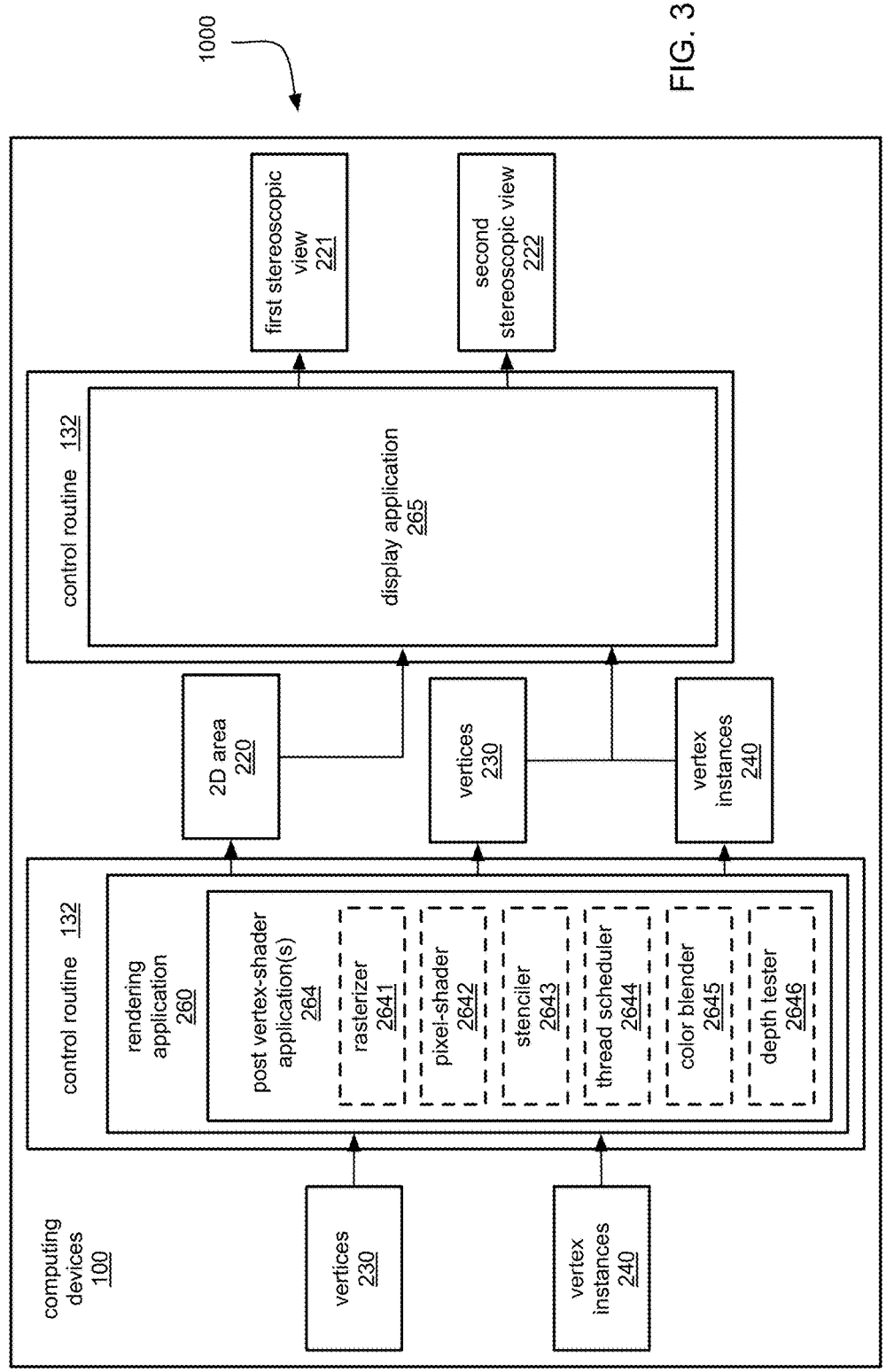

FIGS. 2-3 are simplified block diagrams of a portion of an embodiment of the stereoscopic rendering system 1000 of FIG. 1. In particular, FIG. 2 depicts aspects of generating the 2D area 220 and the vertex instances 240. FIG. 3 depicts aspects of generating the stereoscopic views. In various embodiments, the control routine 132 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor component 110 and/or the GPU 120. Where one or more device drivers are included, those device drivers may provide support for any of a variety of other components, whether hardware or software components of the computer system 100.

Control routine 132 may include or be otherwise linked to communications component 142 executable by the processor component 110 to operate the interface 160 to transmit and receive signals as has been described. Among the signals received may be signals conveying the scene data 210. As familiar to those skilled in the art, each of these communications components is selected to be operable with whatever type of interface technology is selected to implement the interface 160.

Turning more specifically to FIG. 2, a rendering application 260 of the control routine 132 receives scene data 210. It is noted, that scene data 210 may take on a variety of forms, such as, for example, modeling data related to a scene to be displayed. In some examples, the scene data 210 may be represented in a 3D coordinate system. It will be appreciated, that a wide variety of techniques for storing and representing scene data are known. Furthermore, the exact nature and format of the scene data 210 may depend upon the implementation, the architecture of the computing device 100, the processor component 110, the GPU 120, or the hardware and/or software used to implement the rendering application 260.

Vertices 230 are shown corresponding to scene data 210. Scene data 210 may be represented by primitives, which may themselves be defined by vertices. Said differently, the vertices 230 then, correspond to the primitives that represent the scene data 210. More particularly, the vertices 230 correspond to primitives that represent the objects defined by the scene data 210. The rendering application may include a component (e.g., vertex fetcher, etc.) that is not shown, which generates the vertices 230 from the scene data 210. Furthermore, as will be appreciated, the vertices 230 may include a variety of attributes, such as, position, color, texture, shade, shadowing, potential optimizations, or otherwise any attribute used to describe the vertex and it characteristic for purposes of rendering graphics. These attributes may be modified and/or updated as the vertices 230 are processed by the rendering application. Said differently, the attributes of each vertex may be changed as the vertices 230 are processed through the rendering pipeline. As such, the various depictions of the vertices 230 and vertex instances 240 may, or may not, have different attributes from each other, depending upon the stage of the rendering pipeline and which attributes are modified as the vertices are processed by the rendering application.

The rendering application 260 includes an area drawer 262 to generate the 2D area 220. In general, the 2D area 220 corresponds to an area suitable for displaying the scene data 210 in a 2D format and contains portions for each of the stereoscopic views to be generated (refer to FIG. 5.) The rendering application 260 further includes a vertex shader 263 having an instance generator 2631 to generate vertex instances 240 from vertices 230. Furthermore, the vertex shader 263 includes a vertex transformer 2632 for transforming the vertex instances 240 to projected spaces in the 2D area 220. In some embodiments, the vertex transformer includes a matrix multiplier 2633 for transforming the vertex instances 240 to projected spaces in the 2D area based at least in part on multiplying the vertices 230 by a world-view-projection transformation matrix 250.

It is noted, that the vertex instances 240 may derive some attributes from the corresponding vertices 230. Said differently, the vertex instances 240 correspond to specific instances of the vertices 230. Accordingly, some attributes of the vertex instances will be "inherited" from the vertices 230. As such, the vertex instances 240 may merely record data related to the attributes specific to each instance (e.g., position, etc.) Additionally, it is noted, that the vertices 230 and the vertex instances 240 are depicted in various locations in FIGS. 2-3. It is to be appreciated; that one or more attributes of the vertices 230 and/or the vertex instances 240 may be adjusted as they are processed by the rendering application 260. The depiction of the vertices 230 and the vertex instances 240 in these figures, is merely done to facilitate understanding, such as, by showing potential input an outputs and various steps of the rendering pipeline.

Turning now to FIG. 3, the rendering application 260 includes one or more post vertex shader applications 264. It is to be noted, that a variety of steps or operations may be included in a rendering pipeline. The exact implementation details about all steps of the rendering pipeline are beyond the scope of this disclosure. In general, however, the rendering pipeline may include one or more "post vertex shader" operations, such as, for example, rasterization, pixel shading, stenciling, thread scheduling, color blending, or depth testing. These operations may be facilitated by processing the vertices 230 and/or the vertex instances 240 by one or more post vertex shader applications 264, such as, for example, a rasterizer 2641, a pixel shader 2642, a stenciler, 2643, a thread scheduler 2644, a color blender 2645, or a depth tester 2646. The control routing 132 may further include a display application 265 for displaying a first stereoscopic view 221 (e.g. corresponding to the first portion of the 2D area 220) and a second stereoscopic view 222 (e.g. corresponding to the second portion of the 2D area 220).

Figure 4:
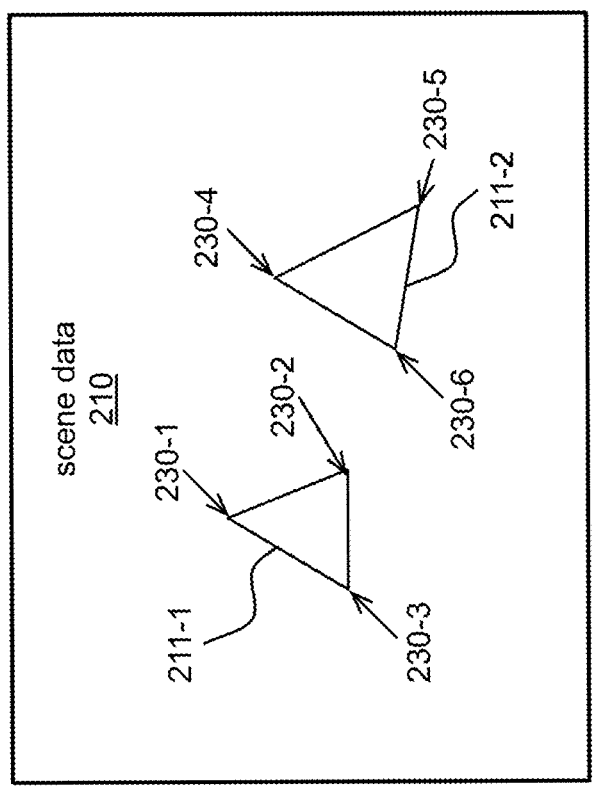
FIG. 4 illustrates generating of vertices corresponding to primitives representing a scene to be displayed according to an embodiment.
Figure 5:
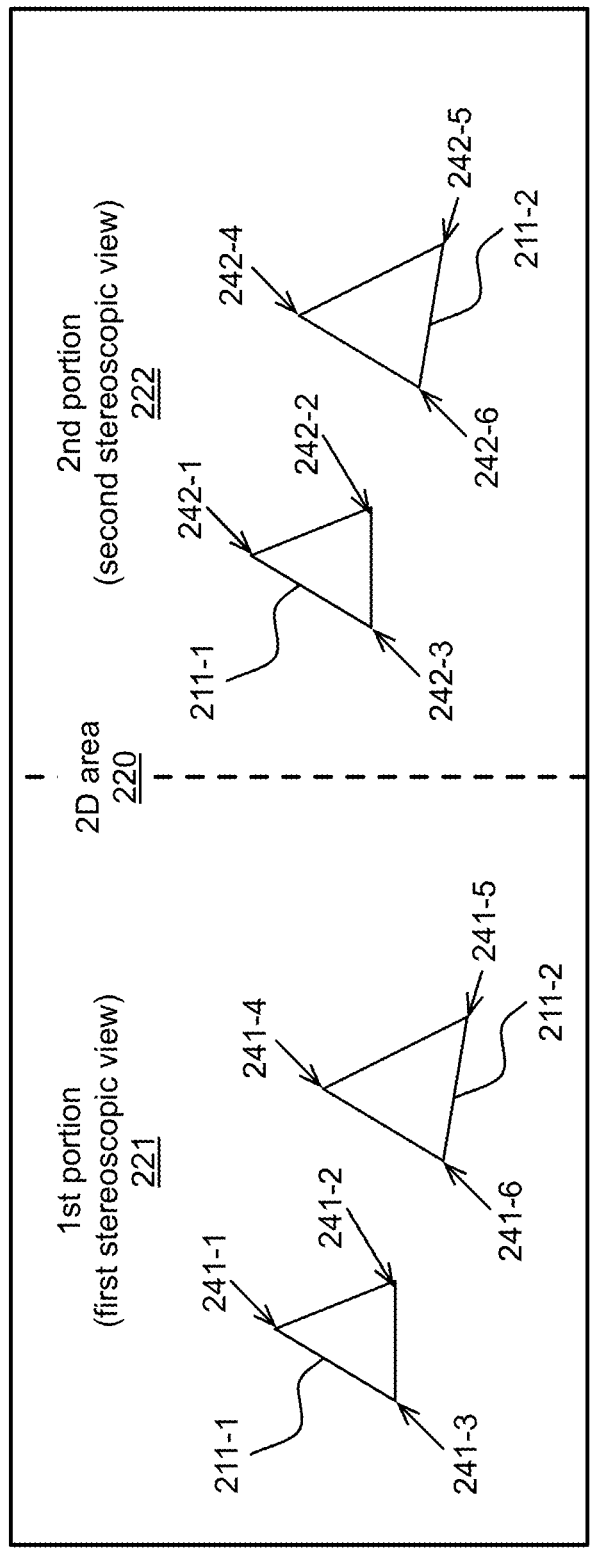
FIG. 5 illustrates generation of instances of vertices and transforming them to positions within portions of a 2D area corresponding to stereoscopic views of a scene to be displayed according to an embodiment.

FIGS. 4-5 depict various examples of scene data 210, 2D area data 220, vertices 230 and vertex instances 240. In one embodiment, scene data 210 may comprise primitives 211 with corresponding vertices 230. A 2D area 220 may be generated and vertex instances 240 of each of the vertices 230 may be transformed to projected spaces in portions of the 2D area 220. The portions of the 2D area 220 may correspond to stereoscopic views of the scene data 210. It should be noted that FIGS. 4-5 depict extremely simplified views of the scene data 210, the primitives 211 and the vertices 230. In particular it is envisioned that many more primitives than shown may be necessary to describe a typical scene. These primitives may take on any shape, size or geometry consistent with representing scene data. The number of primitives 211 is merely shown at a quantity to facilitate understanding. Furthermore, the scene data 210 is depicted in 2D. However, in practice, the scene data 210 may often be represented in 3D. Additionally, the scene data 210 may be represented using a different coordinate system than the 2D area 220. The specific details related to representing scene data 210 by primitives is beyond the scope of this disclosure. In general, FIGS. 4-5 show an example of stereoscopic views may be generated from scene data. Particularly, examples of how vertex instances corresponding to the scene data may be generated and transformed to projected spaces within portions of a 2D area, where each portion corresponds to a one of the stereoscopic views. These stereoscopic views may then be displayed in order to provide an illusion of depth to the scene.

Turning more specifically to FIG. 4, the vertices 230-1 to 230-6 corresponding to primitives 211-1 and 211-2, which represent scene data 210 are shown. As described above, primitives 211-1 and 211-2 represent the scene data 210. Said differently, the primitives 211-1 and 211-2 represent objects within the scene to be displayed.

Turning now to FIG. 5 the area generator 262 of the rendering application 260 generates the 2D area 220. The generated 2D area 220 includes portions (e.g., 221 and 222) corresponding to each of the stereoscopic views to be generated. For example, for two stereoscopic views (e.g., left and right eye views) the 2D area 220 will include two portions. For more stereoscopic views (e.g., for use with autostereoscopic displays, holographic displays, etc.,) the 2D area 220 may include more portions. In some examples, such as, two stereoscopic views, the 2D area 220 may be generated as a split screen. The vertex transformer 2632 of the vertex shader 263 of the rendering application 260 transforms the vertices 230 to projected spaces in each of the portions of the 2D area 220 and saves the transformed positions as the vertex instances 240. For example, first vertex instances 241-1 to 241-6 and second vertex instances 242-1 to 242-6 corresponding to the vertices 230-1 to 230-6 are depicted positioned within the first portion 221 of the 2D area 220 and the second portion 222 of the 2D area 220.

Figure 6:
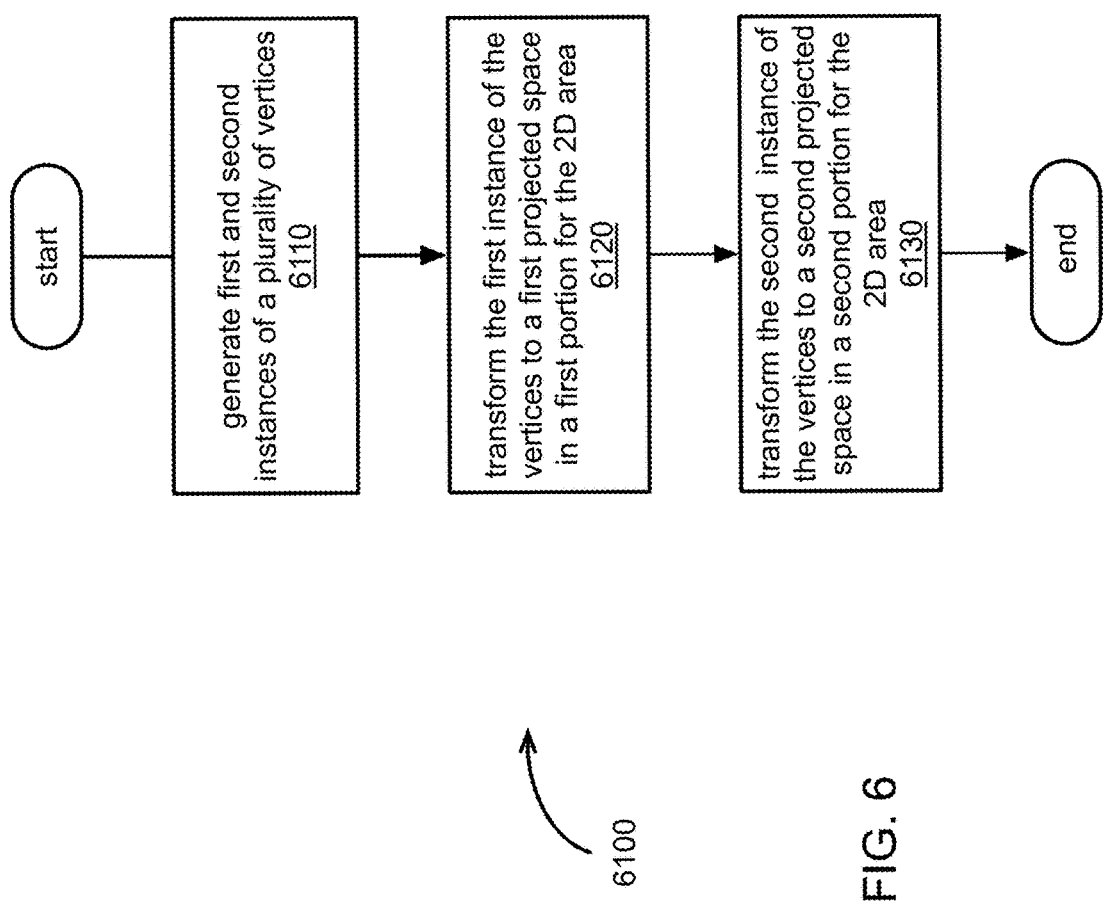
FIG. 6 illustrates a logic flow according to an embodiment.

FIG. 6 illustrates one embodiment of a logic flow 6100. The logic flow 6100 may be representative of some or all of the operations executed by one or more embodiments described herein. More specifically, the logic flow 6100 may illustrate operations performed by the processor component 110 and/or the GPU 120 in executing at least the control routine 132, and/or performed by other component(s) of the computing device 100.

At 6110, a processor component and/or a GPU of a computing device of a stereoscopic rendering system (e.g., the processor component 110 and/or the GPU 120 of the computing device 100 of the stereoscopic rendering system 1000) is caused by execution of a rendering application of a control routine to generate first and second instances of a plurality of vertices corresponding to primitives that are a representation of a scene to be displayed. For example, the rendering application 260 of the control routine 132 may generate the instances 240 (e.g., 241 and 242) of the vertices 230.

At 6120, the processor component and/or a GPU of a computing device of a stereoscopic rendering system (e.g., the processor component 110 and/or the GPU 120 of the computing device 100 of the stereoscopic rendering system 1000) is caused by execution of a rendering application of a control routine to transform the first instance of the plurality of vertices to a first projected space in a first portion of 2D area. For example, the vertex transformer 2632 of the vertex shader 263 of the rendering application of the control routine 132 may transform an instance (e.g., 241) of each of the vertices 230 to a first projected space in the first portion 221 of the 2D area 220.

At 6130, the processor component and/or a GPU of a computing device of a stereoscopic rendering system (e.g., the processor component 110 and/or the GPU 120 of the computing device 100 of the stereoscopic rendering system 1000) is caused by execution of a rendering application of a control routine to transform the second instance of the plurality of vertices to a first projected space in a first portion of 2D area. For example, the vertex transformer 2632 of the vertex shader 263 of the rendering application of the control routine 132 may transform an instance (e.g., 242) of each of the vertices 230 to a second projected space in the second portion 222 of the 2D area 220.

As can be seen from FIG. 5, the positioning of the instances of the vertices 241 and 242 are offset from each other relative to a fixed point (e.g., the center, etc.) in each of the portions of the 2D area. Accordingly, each portion may be used as a stereoscopic view and displayed to a user in a stereoscopic manner in order to provide an illusion of depth to the scene.

Figure 7:
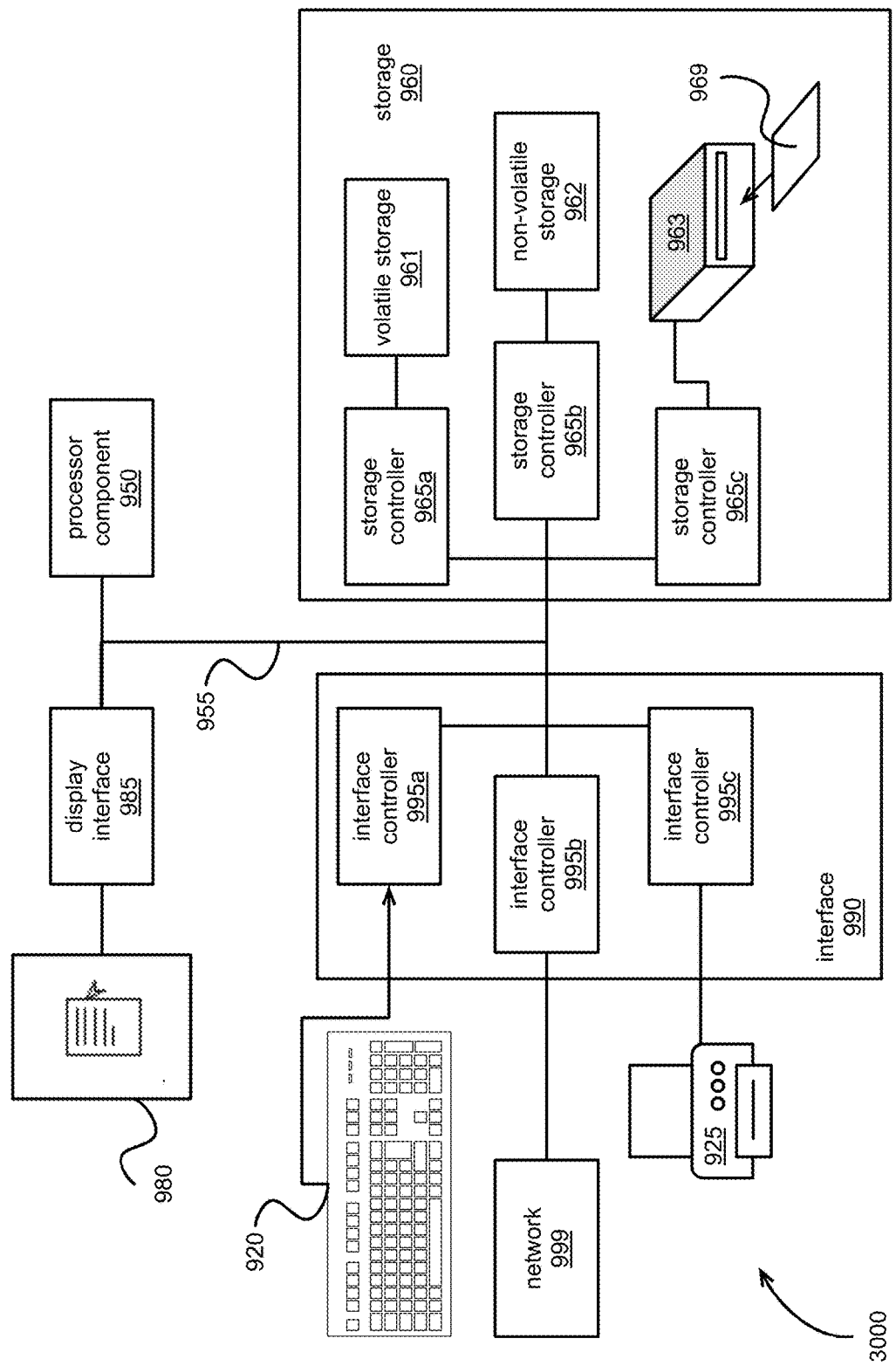
FIG. 7 illustrates a processing architecture according to an embodiment.

FIG. 7 illustrates an embodiment of an exemplary processing architecture 3000 suitable for implementing various embodiments as previously described. More specifically, the processing architecture 3000 (or variants thereof) may be implemented as part of the computing device 100.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor component 110) may include any of a wide variety of commercially available processors, employing any of a wide variety of technologies and implemented with one or more cores physically combined in any of a number of ways.

As previously discussed, the storage 960 (corresponding to the storage 130) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interface 160) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 150), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus for performing stereoscopic rendering of a scene includes a processor component, a rendering application for execution by the processor component, the rendering application including a vertex shader to generate a plurality of vertices corresponding to primitives that are a representation of a scene to be displayed, the vertex shader including an instance generator to generate first and second instances of the plurality of vertices, and a vertex transformer to transform the first instance of the plurality of vertices to a first projected space in a first portion of a two-dimensional (2D) area and to transform the second instance of the plurality of vertices to a second projected space in the 2D area, the first portion of the 2D area corresponding to a first stereoscopic view of the scene and the second portion of the 2D area corresponding to a second stereoscopic view of the scene, wherein the first and second stereoscopic views may be displayed to provide an illusion of depth in a 2D representation of the scene.

The above apparatus wherein the processor component is graphics processing unit (GPU)

The above apparatus wherein the vertex transformer comprising a matrix multiplier to multiply the plurality of vertices with a world-view-projection transformation matrix to determine locations in the 2D area corresponding to the first projected space and the second projected space.

The above apparatus, wherein the world-view-projection transformation matrix defines at least one attribute for the first instance of the plurality of vertices and at least one attribute for the second instance of the plurality of vertices.

The above apparatus, wherein the at least one attribute is a positional offset

The above apparatus, wherein the rendering application further comprising an area drawer to generate the 2D area having the first portion for the first stereoscopic view of the scene and the second portion for the second stereoscopic view of the scene.

The above apparatus, wherein the instance generator to generate a third instance of the plurality of vertices and the vertex transformer to transform the plurality of vertices corresponding to the third instance to a third projected space in a third portion of the 2D representation, the third portion of the 2D representation corresponding to a third stereoscopic view of the scene.

The above apparatus, wherein the first and second projected space are offset from each other relative to a fixed point in each of the first and second portions of the 2D representation.

The above apparatus, wherein the rendering application further comprising a post shader application to apply one or more rendering effects to the plurality of vertices.

The above apparatus, wherein the one or more post shader applications are selected from the group consisting of rasterizer, pixel shader, stenciler, thread scheduler, color blender, or depth tester.

The above apparatus, wherein the first instance of the plurality of vertices and the second instance of the plurality of vertices sharing at least one characteristic.

The above apparatus, wherein the at least one characteristic is selected from the group consisting of normal, texture coordinates, or color.

The above apparatus, further comprising a display and a display applications for execution by the processor component, the display application to cause the display to reproduce the first portion of the 2D representation of the scene in a first time period and reproduce the second portion of the 2D representation of the scene in a second time period.

The above apparatus, wherein the first and second time period corresponding to a display frequency.

Another example of an apparatus to generate vertices for graphical rendering includes graphics processing unit (GPU), an instance generator for execution by the GPU to generate first and second instances of a plurality of vertices corresponding to primitives that are a representation of a scene to be displayed, and a vertex transformer for execution by the GPU to transform the first instance of the plurality of vertices to a first projected space in a first portion of a two-dimensional (2D) area and to transform the second instance of the plurality of vertices to a second projected space in the 2D area, the first portion of the 2D area corresponding to a first stereoscopic view of the scene and the second portion of the 2D area corresponding to a second stereoscopic view of the scene, wherein the first and second stereoscopic views may be displayed to provide an illusion of depth in a 2D representation of the scene.

The above apparatus, further comprising a matrix multiplier for execution by the GPU to multiply the plurality of vertices with a world-view-projection transformation matrix to determine locations in the 2D area corresponding to the first projected space and the second projected space.

The above apparatus, wherein the world-view-projection transformation matrix defines at least one attribute for the first instance of the plurality of vertices and at least one attribute for the second instance of the plurality of vertices.

The above apparatus, wherein the at least one attribute is a positional offset.

The above apparatus, wherein the instance generator to generate a third instance of the plurality of vertices and the vertex transformer to transform the plurality of vertices corresponding to the third instance to a third projected space in a third portion of the 2D representation, the third portion of the 2D representation corresponding to a third stereoscopic view of the scene.

The above apparatus of claim 15, wherein the first and second projected space are offset from each other relative to a fixed point in each of the first and second portions of the 2D representation.

The above apparatus, wherein the first instance of the plurality of vertices and the second instance of the plurality of vertices sharing at least one characteristic.

The above apparatus, wherein the at least one characteristic is selected from the group consisting of normal, texture coordinates, or color.

An example of a computing-implemented method for rendering stereoscopic views of a scene includes generating first and second instances of a plurality of vertices corresponding to primitives that are a representation of a scene to be displayed, transforming the first instance of the plurality of vertices to a first projected space in a first portion of a two-dimensional (2D) area, the first portion of the 2D area corresponding to a first stereoscopic view of the scene, and transforming the second instance of the plurality of vertices to a second projected space in the 2D area, the second portion of the 2D area corresponding to a second stereoscopic view of the scene, wherein the first and second stereoscopic views may be displayed to provide an illusion of depth in a 2D representation of the scene.

The above computer-implemented method, further comprising determining locations in the 2D area corresponding to the first projected space and the second projected space based at least in part on multiplying the plurality of vertices with a world-view-projection transformation matrix to determine.

The above computer-implemented method, wherein the world-view-projection transformation matrix defines at least one attribute for the first instance of the plurality of vertices and at least one attribute for the second instance of the plurality of vertices.

The above computer-implemented method, wherein the at least one attribute is a positional offset The above computer-implemented method, further comprising generating the 2D area having the first portion for the first stereoscopic view of the scene and the second portion for the second stereoscopic view of the scene.

The above computer-implemented method, further comprising generating a third instance of the plurality of vertices and transforming the third instance of the plurality of vertices to a third projected space in a third portion of the 2D representation, the third portion of the 2D representation corresponding to a third stereoscopic view of the scene.

The above computer-implemented method, wherein the first and second projected space are offset from each other relative to a fixed point in each of the first and second portions of the 2D representation.

The above computer-implemented method, further comprising applying one or more post vertex-shader effects to the plurality of vertices.

The above computer-implemented method, wherein the one or more post vertex-shader effects are selected from the group consisting of rasterizion, pixel shading, stenciling, thread scheduling, color blending, or depth testing.

The above computer-implemented method, wherein the first instance of the plurality of vertices and the second instance of the plurality of vertices sharing at least one characteristic.

The above computer-implemented method, wherein the at least one characteristic is selected from the group consisting of normal, texture coordinates, or color.

The above computer-implemented method, further comprising displaying the first portion of the 2D representation of the scene in a first time period and displaying the second portion of the 2D representation of the scene in a second time period.

The above computer-implemented method, the first and second time period corresponding to a display frequency.

At least one machine-readable storage medium comprising instructions that when executed by a computing device, cause the computing device to perform any of the above computer-implemented methods.

An apparatus to render stereoscopic views of a scene comprising means for performing any of the above computer-implemented methods.

An example of at least one machine-readable storage medium comprising instructions that when executed by a computing device, cause the computing device to generate first and second instances of a plurality of vertices corresponding to primitives that are representation of a scene to be displayed, transform the first instance of the plurality of vertices to a first projected space in a first portion of a two-dimensional (2D) area, the first portion of the 2D area corresponding to a first stereoscopic view of the scene, and transform the second instance of the plurality of vertices to a second projected space in the 2D area, the second portion of the 2D area corresponding to a second stereoscopic view of the scene, wherein the first and second stereoscopic views may be displayed to provide an illusion of depth in a 2D representation of the scene, the first and second projected spaces offset from each other relative to a fixed point in each of the first and second portions of the 2D representation.

The above at least one machine-readable storage medium, the computing device caused to determine locations in the 2D area corresponding to the first projected space and the second projected space based at least in part on multiplying the plurality of vertices with a world-view-projection transformation matrix to determine.

The above at least one machine-readable storage medium, wherein the world-view-projection transformation matrix defines at least one attribute for the first instance of the plurality of vertices and at least one attribute for the second instance of the plurality of vertices.

The above at least one machine-readable storage medium, wherein the at least one attribute is a positional offset.

The above at least one machine-readable storage medium, the computing device caused to generate the 2D area having the first portion for the first stereoscopic view of the scene and the second portion for the second stereoscopic view of the scene.

The above at least one machine-readable storage medium, the computing device caused to generate a third instance of the plurality of vertices and transform the third instance of the plurality of vertices to a third projected space in a third portion of the 2D representation, the third portion of the 2D representation corresponding to a third stereoscopic view of the scene.

The above at least one machine-readable storage medium, the computing device caused to apply one or more post vertex-shader effects to the plurality of vertices.

The above at least one machine-readable storage medium, wherein the one or more post vertex-shader effects are selected from the group consisting of rasterizion, pixel shading, stenciling, thread scheduling, color blending, or depth testing.

The above at least one machine-readable storage medium, the first instance of the plurality of vertices and the second instance of the plurality of vertices sharing at least one characteristic.

The above at least one machine-readable storage medium, wherein the at least one characteristic is selected from the group consisting of normal, texture coordinates, or color.

The above at least one machine-readable storage medium, the computing device caused to display the first portion of the 2D representation of the scene in a first time period and display the second portion of the 2D representation of the scene in a second time period.

The above at least one machine-readable storage medium, the first and second time period corresponding to a display frequency.

What is claimed is:

1. An apparatus to perform stereoscopic rendering of a scene, comprising:
    a processor component;
    one vertex shader to generate a plurality of vertices corresponding to primitives that are a representation of the scene to be displayed, the one vertex shader including:
        an instance generator to generate both first and second instances of the plurality of vertices during a single execution of the one vertex shader, wherein both the first and the second instances of the plurality of vertices comprise vertex positions in a three-dimensional space of the scene; and
        a vertex transformer to transform the first instance of the plurality of vertices to a first projected space in a first portion of a two-dimensional (2D) area and to transform the second instance of the plurality of vertices to a second projected space in a second portion of the 2D area, the first portion of the 2D area corresponding to a first stereoscopic view of the scene and the second portion of the 2D area corresponding to a second stereoscopic view of the scene, wherein the first and second stereoscopic views may be displayed to provide an illusion of depth in a 2D representation of the scene.

2. The apparatus of claim 1, wherein the processor component is graphics processing unit (GPU).

3. The apparatus of claim 1, the vertex transformer comprising a matrix multiplier to multiply the plurality of vertices with a world-view-projection transformation matrix to determine locations in the 2D area corresponding to the first projected space and the second projected space, wherein the world-view-projection transformation matrix defines at least one attribute for the first instance of the plurality of vertices and at least one attribute for the second instance of the plurality of vertices.

4. The apparatus of claim 3, wherein the at least one attribute of the first instance and the second instance is a positional offset.

5. The apparatus of claim 1, further comprising an area drawer to generate the 2D area having the first portion for the first stereoscopic view of the scene and the second portion for the second stereoscopic view of the scene.

6. The apparatus of claim 1, the instance generator to generate a third instance of the plurality of vertices and the vertex transformer to transform the plurality of vertices corresponding to the third instance to a third projected space in a third portion of the 2D representation, the third portion of the 2D representation corresponding to a third stereoscopic view of the scene.

7. The apparatus of claim 1, further comprising one or more post shader applications to apply one or more rendering effects to the plurality of vertices, wherein the one or more post shader applications are selected from the group consisting of rasterizer, pixel shader, stenciler, thread scheduler, color blender, or depth tester.

8. The apparatus of claim 1, the first instance of the plurality of vertices and the second instance of the plurality of vertices sharing at least one characteristic.

9. The apparatus of claim 8, wherein the at least one characteristic is selected from the group consisting of normal, texture coordinates, or color.

10. An apparatus to generate vertices for graphical rendering comprising:
    graphics processing unit (GPU);
    an instance generator for execution by the GPU to generate, during a single execution of one vertex shader, both first and second instances of a plurality of vertices corresponding to primitives that are a representation of a scene to be displayed, wherein both the first and the second instances of the plurality of vertices comprise vertex positions in a three-dimensional space of the scene; and
    a vertex transformer for execution by the GPU to transform the first instance of the plurality of vertices to a first projected space in a first portion of a two-dimensional (2D) area and to transform the second instance of the plurality of vertices to a second projected space in a second portion of the 2D area, the first portion of the 2D area corresponding to a first stereoscopic view of the scene and the second portion of the 2D area corresponding to a second stereoscopic view of the scene, wherein the first and second stereoscopic views may be displayed to provide an illusion of depth in a 2D representation of the scene.

11. The apparatus of claim 10, further comprising a matrix multiplier for execution by the GPU to multiply the plurality of vertices with a world-view-projection transformation matrix to determine locations in the 2D area corresponding to the first projected space and the second projected space.

12. The apparatus of claim 11, wherein the world-view-projection transformation matrix defines at least one attribute for the first instance of the plurality of vertices and at least one attribute for the second instance of the plurality of vertices.

13. The apparatus of claim 12, wherein the at least one attribute of the first instance and the second instance is a positional offset.

14. A computing-implemented method for rendering stereoscopic views of a scene comprising:
    generating, during a single execution of one vertex shader, both first and second instances of a plurality of vertices corresponding to primitives that are a representation of the scene to be displayed, wherein both the first and the second instances of the plurality of vertices comprise vertex positions in a three-dimensional space of the scene;
    transforming the first instance of the plurality of vertices to a first projected space in a first portion of a two-dimensional (2D) area, the first portion of the 2D area corresponding to a first stereoscopic view of the scene; and
    transforming the second instance of the plurality of vertices to a second projected space in a second portion of the 2D area, the second portion of the 2D area corresponding to a second stereoscopic view of the scene, wherein the first and second stereoscopic views may be displayed to provide an illusion of depth in a 2D representation of the scene.

15. The computer-implemented method of claim 14, further comprising determining locations in the 2D area corresponding to the first projected space and the second projected space based at least in part on multiplying the plurality of vertices with a world-view-projection transformation matrix to determine.

16. The computer-implemented method of claim 15, wherein the world-view-projection transformation matrix defines at least one attribute for the first instance of the plurality of vertices and at least one attribute for the second instance of the plurality of vertices.

17. The computer-implemented method of claim 16, wherein the at least one attribute of the first instance and the second instance is a positional offset.

18. The computer-implemented method of claim 14, further comprising generating the 2D area having the first portion for the first stereoscopic view of the scene and the second portion for the second stereoscopic view of the scene.

19. The computer-implemented method of claim 14, further comprising applying one or more post vertex-shader effects to the plurality of vertices.

20. The computer-implemented method of claim 19, wherein the one or more post vertex-shader effects are selected from the group consisting of rasterizion, pixel shading, stenciling, thread scheduling, color blending, or depth testing.

21. The computer-implemented method of claim 14, further comprising displaying the first portion of the 2D representation of the scene in a first time period and displaying the second portion of the 2D representation of the scene in a second time period.

22. The computer-implemented method of claim 21, the first and second time period corresponding to a display frequency.

23. At least one machine-readable non-transitory storage medium comprising instructions that when executed by a computing device, cause the computing device to:

generate, during a single execution of one vertex shader, both first and second instances of a plurality of vertices corresponding to primitives that are representation of a scene to be displayed, wherein both the first and the second instances of the plurality of vertices comprise vertex positions in a three-dimensional space of the scene;

transform the first instance of the plurality of vertices to a first projected space in a first portion of a two-dimensional (2D) area, the first portion of the 2D area corresponding to a first stereoscopic view of the scene; and transform the second instance of the plurality of vertices to a second projected space in a second portion of the 2D area, the second portion of the 2D area corresponding to a second stereoscopic view of the scene, wherein the first and second stereoscopic views may be displayed to provide an illusion of depth in a 2D representation of the scene, the first and second projected spaces offset from each other relative to a fixed point in each of the first and second portions of the 2D representation.

24. The at least one machine-readable non-transitory storage medium of claim 23, the computing device caused to determine locations in the 2D area corresponding to the first projected space and the second projected space based at least in part on multiplying the plurality of vertices with a world-view-projection transformation matrix to determine.

25. The at least one machine-readable non-transitory storage medium of claim 24, wherein the world-view-projection transformation matrix defines at least one attribute for the first instance of the plurality of vertices and at least one attribute for the second instance of the plurality of vertices.

* * * * *